Patented Feb. 14, 1939

2,147,488

UNITED STATES PATENT OFFICE 2,147,488

HIGH VACUUM

Kenneth C. D. Hickman and James G. Baxter, Rochester, N. Y., assignors, by mesne assignments, to Distillation Products, Inc., Rochester, N. Y., a corporation of Delaware No Drawing. Application October 23, 1936, Serial No. 107,256

3 Claims. (Cl. 230—101)

This invention pertains to improved method and apparatus for the production of high vacua and, particularly, to the provision of improved organic pump fluids for use in high vacuum pumps of the general nature of diffusion or condensation pumps.

In the U. S. Hickman Patents 1,857,506 and 1,857,508, there are disclosed improved pumping organic fluids for use in condensation or diffusion pumps. The materials disclosed were phthalic acid esters from methyl to amyl, a preference being indicated for the butyl homologue. These materials represent a decided advance over the use of mercury for the same purpose, but we have found that other organic materials have decidedly better pumping properties than the materials disclosed in these patents.

The pumping fluids which we have found to have decidedly advantageous characteristics are the phthalic acid esters of alcohols having from 6–9 carbon atoms, inclusive, and especially the esters of aliphatic alcohols having 7, 8 or 9 carbon atoms. Examples of such esters are:

1. Di n-hexyl phthalate
2. Di n-heptyl phthalate
3. Di n-octyl phthalate
4. Di (2-ethyl hexyl) phthalate
5. Di n-nonyl phthalate
6. Di ($\beta$-phenyl ethyl) phthalate Combinations in which two different alcohols are reacted with the two carboxyl groups of the phthalic acid molecule may, of course, be used. Also isomeric forms of these alcohols give compounds having the same or similar desirable properties.

These phthalic acid esters can be prepared by using any one of a variety of different processes for ester production. One well known method which has been found to give excellent yields is to mix one molecular portion of phthalic anhydride with an equal weight of toluene and 2-3 molecular proportions of the appropriate alcohol. This mixture is mechanically stirred in a round bottom flask at a temperature below the boiling point of toluene until a clear solution results. A quantity of para toluene sulfonic acid amounting to 1% of phthalic anhydride is then added as a catalyst. The mixture is then heated to distillation temperature, water formed during the reaction being distilled off with part of the toluene, the mixed vapors being condensed, stratified, and the top layer of toluene being returned to the reaction mixture. Practically complete esterification is obtained in about 7 hours using this method. The phthalic acid ester is removed and washed with cold 10% aqueous sodium chloride to which was added at each extraction a small amount of 10% sodium hydroxide containing an indicator, such as phenolphthalein. Extraction is continued until the indicator color is no longer discharged indicating that the excess phthalic anhydride has been neutralized. The esterification mixture is then washed with water to remove the last traces of soap and dried over sodium sulfate. Toluene is separated from the ester thus formed by distillation at water pump vacuum and finally the ester is distilled at a pressure of about .1 of a mm. The esters prepared in this manner are pale yellow in color and quite mobile and are suitable for use as condensation pump fluids. Other methods of ester production well known in the chemical art can, of course, be used if desired.

These esters have surprising characteristics as condensation pump fluids. All of them have a lower vapor pressure than those heretofore employed as pump fluids and for that reason enable the production of much higher vacua. For this reason cooled traps need not be used in most cases. In spite of their low vapor pressure they are nevertheless very resistant to thermal decomposition such as often takes place during normal pumping action or as a result of accidental hot exposure at atmospheric pressure. Recovery from such exposure is also very rapid and unless the exposure is greatly prolonged little damage takes place. They have a high pumping rate and will produce rapidly a higher vacuum at 25° C. than any other organic or inorganic pump liquid heretofore known.

The improved fluids are used in condensation pumps of any design, but are preferably used in condensation pumps especially designed for organic fillings such as those disclosed in the Hickman patents above referred to and in the co-pending Hickman application #27,652 filed June 21, 1935.

The following tables indicate the improved pumping qualities of these esters as regards degree of vacua obtainable and rate of conditioning.

Table I

| Pump fluid | Pressure attained at 25° C. |
|---|---|
| | Mm. |
| n-Butyl phthalate | $2 \times 10^{-4}$ |
| n-Hexyl phthalate | $3 \times 10^{-6}$ |
| n-Heptyl phthalate | $2.5 \times 10^{-7}$ |
| n-Octyl phthalate | $5 \times 10^{-8}$ |
| 2-ethyl hexyl phthalate | $5 \times 10^{-7}$ |
| n-Nonyl phthalate | $2 \times 10^{-7}$ |

Table I indicates the minimum pressures obtainable with the improved pump fluids as compared with butyl phthalate. The determinations were made with an uncooled trap held at 25° C. It is seen that our new pump fluids enable the production of very high vacua which heretofore required elaborate pumping equipment and cumbersome and expensive cooled traps. When cooled traps are used with our pump fluids a vacuum is rapidly established which is below the limits of measurement with known pressure measuring devices.

Table II

|  | Rate of conditioning of fresh fillings | Rate of conditioning after hot exposure |
| --- | --- | --- |
| n-Hexyl phthalate | 30 minutes | < 30 minutes |
| n-Heptyl phthalate | 2 hours | 140 minutes |
| n-Octyl phthalate | 14 hours | 3 hours |
| Hydrocarbon oil | 72 hours | 16 hours |

The rate of conditioning of a pump fluid is of importance since this property determines the amount of time required for the pump to produce the maximum vacuum. During use in commercial operation the pump will often be accidentally exposed to atmospheric pressure causing partial or complete destruction of the pump fluid depending upon its resistance to such treatment. A pump fluid which will withstand hot exposure, and quickly reestablish a high vacuum after such treatment is a necessity in most pumping operations. Table II shows the rate of conditioning of fresh pump fluids and of pump fluids subjected to hot exposure for the indentical periods of time. The hydrocarbon oil is a well known condensation pump fluid produced by molecular distillation of a petroleum oil. It is seen that our improved fluids condition much more rapidly than the hydrocarbon pump fluids heretofore used.

Phthalic acid occurs in a plurality of isomeric forms. The ordinary (ortho) form is preferred for use in preparing the improved pump fluids, but the other isomeric forms such as terephthalic acid are suitable and are to be understood as being within the scope of our invention.

What we claim is:

1. A means for evacuating closed vessels which comprises a diffusion or condensation pump containing a di octyl phthalate as an evacuating medium.

2. A means for evacuating closed vessels which comprises a diffusion or condensation pump containing di-n-octyl phthalate as an evacuating medium.

3. A means for evacuating closed vessels which comprises a diffusion or condensation pump containing di-2-ethyl hexyl phthalate as an evacuating medium.

KENNETH C. D. HICKMAN.
JAMES G. BAXTER.